UNITED STATES PATENT OFFICE.

HINRICH PETER DIEDRICH OHLHAVER, OF HAMBURG, GERMANY.

MANTLE FOR INCANDESCENT GAS-BURNERS.

SPECIFICATION forming part of Letters Patent No. 603,473, dated May 3, 1898.

Application filed July 15, 1897. Serial No. 644,705. (No model.)

*To all whom it may concern:*

Be it known that I, HINRICH PETER DIEDRICH OHLHAVER, of Hamburg, in the German Empire, have invented new and useful Improvements in and Relating to Mantles and the Like for Incandescent Gas-Burners, of which the following is a specification.

Mantles or the like for incandescent burners containing a thorium and a cerium oxid give, when heated in a Bunsen flame and when about ninety-nine parts of thorium oxid and one part of cerium oxid are used, the maximum illuminating power which can be obtained with these two materials and a white light. With an increasing percentage of cerium oxid the color of the light turns to yellow and the illuminating power decreases very considerably. Thus a mantle or the like composed of about ninety-six parts of thorium oxid and four parts of cerium oxid gives a light of a yellow color and of a very considerably smaller illuminating power. Now on adding about twenty-five per cent. of silicic acid to a mixture of ninety-six parts of thorium oxid and four parts of cerium oxid the color of the light emitted from a mantle or the like made of said mixture is no longer a pronounced yellow, but is pure white, and its illuminating power is even greater than that of a mantle or the like composed of ninety-nine parts of thorium oxid and one part of cerium oxid. According to the proportions of the mixture employed of thorium oxid and cerium oxid and according to the desired color of the light the addition of silicic acid may be made greater or smaller. Even the use of small quantities of silicic acid has a favorable effect upon the mantles or the like. In general it may be stated that as a rule with the presence of silicic acid the percentage of cerium oxid in proportion to the thorium oxid in order to obtain the most favorable illuminating effect must not be appreciably greater than is the case with mantles or the like which are composed solely of thorium oxid and cerium oxid.

The illuminating power of mantles and the like containing silicic acid generally increases considerably in intensity for about and during the first ten hours of burning and then remains constant during the whole time of burning, because the several components have imparted to them by the silicic acid a considerably-increased degree of refractoriness or resistance to the action of fire, which renders volatilization of the same impossible, while mantles or the like which contain silicic acid have also a much greater resistance or strength and are therefore better able to withstand external influences. The considerable influence exerted by silicic acid is also shown by the fact that a mantle of thorium oxid and cerium oxid weighs about six hundred milligrams, while the same body of exactly the same dimensions, but containing about twenty per cent. of silicic acid, has only a weight of about three hundred and fifty milligrams.

In manufacturing mantles according to my process an aqueous solution of salts of thorium and cerium is produced, and to this solution pure silicic acid is added, (hydrates,) which, as is well known, can be obtained by the disassociation of silicates and dialysis of the silicic acid resulting. With this mixture of solutions the usual tissues are impregnated. After the drying of the impregnated tissues they are burned and the mantle incandescent body is ready for use. Owing to the presence of silicic acid new chemical combinations result—namely, silicates. The production can therefore take place analogously to the Auer process. The only difference is that to the thorium and cerium solutions silicic acid is added.

My improved mantle may also be produced by impregnating the tissues with water-glass (silicate of alkali) and the impregnated tissues treated with a precipitating agent—for example, muriatic acid, which precipitates pure silicic acid within the tissues themselves. The auxiliary salts formed—for example, alkali chlorids—are removed by washing. The tissues so prepared after the washing only contain silicic acid. After they are dry they are impregnated with a solution of thorium and cerium salts—viz., thorium and cerium nitrates. Upon being again dried the tissues are burned, and the incandescent body or mantle is ready for use. It consists likewise of silicates of thorium and cerium.

A pure solution of silicic acid is produced from the dilute solution of alkaline silicates by the addition of acid and the separation of the crystalloids and of the acid in excess by means of dialysis. The solution of silicic acid remaining in the dialysator is added to the solution of thorium and cerium and the fabrics are impregnated in the usual manner therewith. The fabrics may also be first impregnated with silicate of potassium or of soda, ("water-glass,") from which silicic acid may be precipitated in the fabric by means of suitable precipitating agents, and the soda salts or potash salts thus formed can be removed by washing, or the fabrics may be impregnated with hydrosilicofluoric acid and after drying may be treated with ammonia, whereby silicic acid is separated and the fluor-ammonium is dissolved, or the fabric may be impregnated with chlorid of silicon and the silicic acid be precipitated in the fabric in an insoluble form by means of water. The silicic-acid fabrics formed in this manner would then be further treated with solutions of thorium oxid and cerium oxid.

What I claim, and desire to secure by Letters Patent of the United States, is—

1. A mantle or the like for incandescent burners, composed of thorium and cerium oxid, containing silicic acid for the purpose of improving the duration of illumination, the emission of light, the fireproof quality, and the strength of resistance of the mantle substantially as described.

2. The process of manufacturing mantles or the like for incandescent burners, consisting in impregnating a fabric with a solution of thorium, cerium and silicic acid and burning the impregnated fabric, substantially as set forth.

3. The process of manufacturing mantles or the like for incandescent burners, consisting in precipitating silicic acid within the fibers of the fabric, impregnating the fabric with a solution of thorium and cerium salts, and then burning out the fabric, substantially as set forth.

In witness whereof I have hereunto set my hand in presence of two witnesses.

HINRICH PETER DIEDRICH OHLHAVER.

Witnesses:
JULIUS STEINBACH,
GUSTAV WEBER.